US007844832B2

(12) United States Patent
Nation et al.

(10) Patent No.: US 7,844,832 B2
(45) Date of Patent: Nov. 30, 2010

(54) SYSTEM AND METHOD FOR DATA SOURCE AUTHENTICATION AND PROTECTION SYSTEM USING BIOMETRICS FOR OPENLY EXCHANGED COMPUTER FILES

(76) Inventors: Ron L. Nation, 120 Stonepost Rd., Longwood, FL (US) 32779; Rodney P. Meli, 856 Silversmith Cir., Lake Mary, FL (US) 32746; William T. Garner, 108 Larkwood Dr., Sanford, FL (US) 32771

( * ) Notice: Subject to any disclaimer, the term of this patent is extended or adjusted under 35 U.S.C. 154(b) by 1002 days.

(21) Appl. No.: 11/564,655

(22) Filed: Nov. 29, 2006

(65) Prior Publication Data

US 2007/0208952 A1    Sep. 6, 2007

Related U.S. Application Data

(60) Provisional application No. 60/740,569, filed on Nov. 29, 2005.

(51) Int. Cl.
*H04L 9/32* (2006.01)
*G06F 21/00* (2006.01)
*G06F 7/04* (2006.01)

(52) U.S. Cl. ............ 713/190; 713/168; 713/175; 713/179; 713/181; 713/186; 726/26; 726/27

(58) Field of Classification Search .......... 713/168, 713/170, 186, 190, 161; 704/270.1; 340/5.8, 340/5.82; 726/26, 27
See application file for complete search history.

(56) References Cited

U.S. PATENT DOCUMENTS

| | | | |
|---|---|---|---|
| 5,495,533 A * | 2/1996 | Linehan et al. | 713/155 |
| 2002/0104006 A1* | 8/2002 | Boate et al. | 713/186 |
| 2002/0116508 A1* | 8/2002 | Khan et al. | 709/229 |
| 2003/0084003 A1* | 5/2003 | Pinkas et al. | 705/71 |
| 2005/0005166 A1* | 1/2005 | Kouznetsov et al. | 713/201 |
| 2006/0041930 A1* | 2/2006 | Hafeman et al. | 726/2 |
| 2007/0157031 A1* | 7/2007 | Sudhakar | 713/189 |

FOREIGN PATENT DOCUMENTS

WO    WO 0103077 A1 *   1/2001

OTHER PUBLICATIONS

Globally Unique Identifier. In Microsoft Computer Dictionary. Microsoft Press 2002.*
U.S. Appl. No. 12/472,122, filed May 26, 2009, Lai et al.
U.S. Appl. No. 12/472,232, filed May 26, 2009, Lai et al.

* cited by examiner

*Primary Examiner*—Kambiz Zand
*Assistant Examiner*—Imhotep Durham

(57) ABSTRACT

A system and method for authenticating the source of, protecting the contents of, and ensuring the integrity of information. The information may be any digital information which can be stored in a computer file. The information is encapsulated in a computer file which also includes the biometrically verified identity of the person who packaged the information. The contents of the computer file are encrypted, and a unique message digest value is generated and stored in a secure central database. The message digest value functions as the digital signature of the encrypted information, and is used to ensure the integrity of the information.

20 Claims, 13 Drawing Sheets

Login with Password & Fingerprint

Capture Fingerprints

Save Fingerprints

Activate User

Check License Key

Enter License Information

SYSTEM AND METHOD FOR DATA SOURCE AUTHENTICATION AND PROTECTION SYSTEM USING BIOMETRICS FOR OPENLY EXCHANGED COMPUTER FILES

CROSS REFERENCE TO RELATED APPLICATIONS

This application claims the benefit of U.S. Provisional Application No. 60/740,569 filed Nov. 29, 2005.

FIELD

The present disclosure relates to electronic commerce. More specifically, the present disclosure relates to a data source authentication and protection system using biometrics for openly exchanged computer files.

BACKGROUND

Electronic commerce has replaced a substantial portion of document exchange. In a number of applications, such document exchange has involved information that, if compromised, could create substantial adverse financial issues for the parties. One example of such exchange is the electronic transmission of property appraisals, where such appraisals are used by lending entities as the basis for authorizing funds to dispensed. If such appraisals are falsely submitted for higher than actual value of the property, the lending entity could dispense funds that are not supported by the property and the excess funds could be siphoned off illegally. This is a major issue with entities such as Housing and Urban Development Department (HUD) of the U.S. government. Accordingly, what is needed is a system and method for assuring that documents received via electronic transmission are from the actual person or entity stated in the transfer to be the originator of the document.

SUMMARY

An embodiment relates to a system and method for authenticating the source of, protecting the contents of, and ensuring the integrity of information. The information may be any digital information which can be stored in a computer file. The information is encapsulated in a computer file which also includes the biometrically verified identity of the person who packaged the information. The contents of the computer file are encrypted, and a unique message digest value is generated and stored in a secure central database. The message digest value functions as the digital signature of the encrypted information, and is used to ensure the integrity of the information.

The process of putting information into the computer file, providing biometrically verified identification credentials of the person packaging the information, and encrypting the contents of the computer file is called "wrapping". The original computer file is referred to as the "data file". The product of the wrapping process is referred to as a "wrapped file". The identity of the person who wraps a file is verified using a combination of a username, a secret password and the user's biometric identifier. The embodiment uses fingerprint matching technology or any biometric device to implement the biometric identification system.

The writer application is used to perform the tasks of user authentication and authorization, encapsulation of information, encryption, and generation of the message digest value. The writer application communicates with a secure web service via encrypted XML messages to perform all required operations. The writer application includes functionality for user registration, biometric enrollment, license activation and other administrative tasks which can be performed by the user to create a wrapped file from a data file.

The reader application must be used to open a wrapped file. The contents of a wrapped file cannot be accessed without the use of the reader application. The reader application communicates with the secure web service via encrypted XML messages to perform all required operations. The reader application generates the message digest value from the wrapped file, and extracts other needed information. The reader application encrypts the extracted information and sends a message to the secure web service to request processing. The successful processing of the request, including the processing of the message digest value, guarantees that the wrapped file has not been altered in any way. The secure web service encrypts a response message which provides a decryption key and other required data to enable the wrapped file to be opened and viewed or stored. The biometrically verified identity of the person who opened the wrapped file may be optionally required.

It is important to note that the embodiment uses a licensing mechanism to control the wrapping and unwrapping of information. The default license is available to all activated users of the writer and reader applications, and is called the public license. A data file which is wrapped without specifying a license uses the public license by default. If the user of the writer application has another active license (not the public license), it may be selected during the wrapping process. The user of the reader application must have a license which is compatible with the one used by the writer in order to unwrap the wrapped file. The license processing which is performed by the web service during the wrapping data files and unwrapping of wrapped files ensures that all license rules are strictly enforced.

The embodiment provides multiple layers of security in all sensitive areas. The processes and procedures which have been defined for installation, registration, enrollment and activation help ensure that biometric identification credentials of users of the writer application cannot be falsified. These processes and procedures work together with layers of software security technology to ensure the integrity of the information being protected. The software technology used to implement the layers of protection include secure communication between the client applications and the web service, layered encryption, proprietary encryption key management, insertion of blocks of seemingly random data, information obfuscation, digital signature generation, and encryption based application security.

BRIEF DESCRIPTION OF THE DRAWINGS

The accompanying drawings, which are included to provide a further understanding of described embodiments.

DETAILED DESCRIPTION

An example embodiment involves Microsoft Windows based workstations with high speed internet connections for a writer application and a reader application. The writer workstations use a compatible fingerprint sensor (or other suitable biometric sensor) which captures biometric information from a user. The reader workstations may include a compatible fingerprint sensor (or other suitable biometric sensor), to capture the biometric information from the user, depending on business requirements. In this environment, the internet web service would be hosted on a Microsoft Windows server and the central database would be hosted on a dedicated Microsoft Windows server.

FIG. 1 through FIG. 21 illustrate example processes involved in the registration, enrollment, and activation of a user, as well as the processes involved in activating a license and wrapping a document. These processes are described in detail below. As described in the Summary above, a "user" is a person who is authorized to verify an electronic transmission, e.g., a user might be a real estate appraiser as described in the Background above. For a user to be authorized, he/she must be registered as an active writer. Once registered, the user can then create a data file and "wrap" the file for electronic transmission. Registration.

Figure 1:
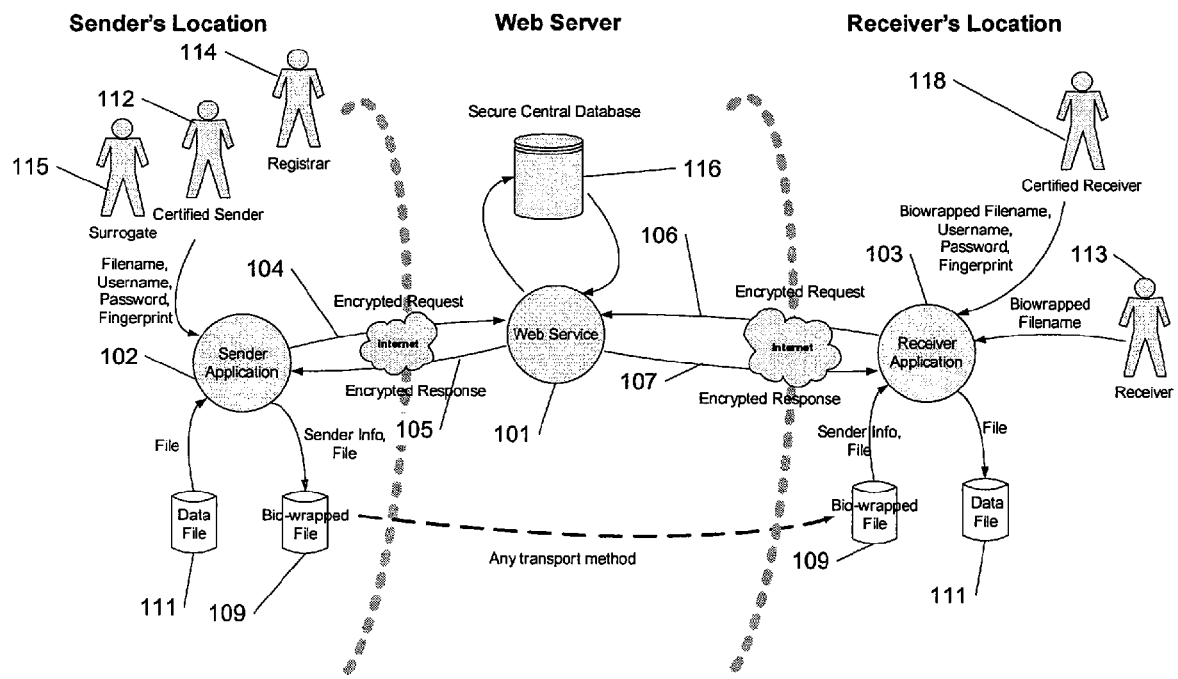
FIG. 1 illustrates the operational environment according an exemplary embodiment.

Referring to FIG. 1, in order to wrap a data file 111, the user must be an active writer 112, or surrogate. There are several steps involved in becoming active. Once the writer 112 is activated then surrogate 115 may be activated by the writer. The first step towards becoming an active writer 112 is the user registration process 600, illustrated in FIG. 2. The user enters their personal, professional, and license information in step 1202 The user also selects their username and password for the system in step 1202, described with reference to FIG. 8. The writer application 102 sends all of this registration information to the web service 101 in step 1204. The web service 101 creates an installation key for the user in step 1206. In step 1208, the web service 101 validates the registration information and stores it in the central database 116 along with the installation key and updated user status. The installation key is sent to the user via email in step 1212. If a license was entered by the user its entry in the central database 116 is updated in step 1214. The web service 101 returns the registration status to the writer application 102 in step 1216. A registered user may be referred to herein as a "writer" since that entity will be recognized by the system as authorized to send electronic files.

Biometric Enrollment

Figure 3:
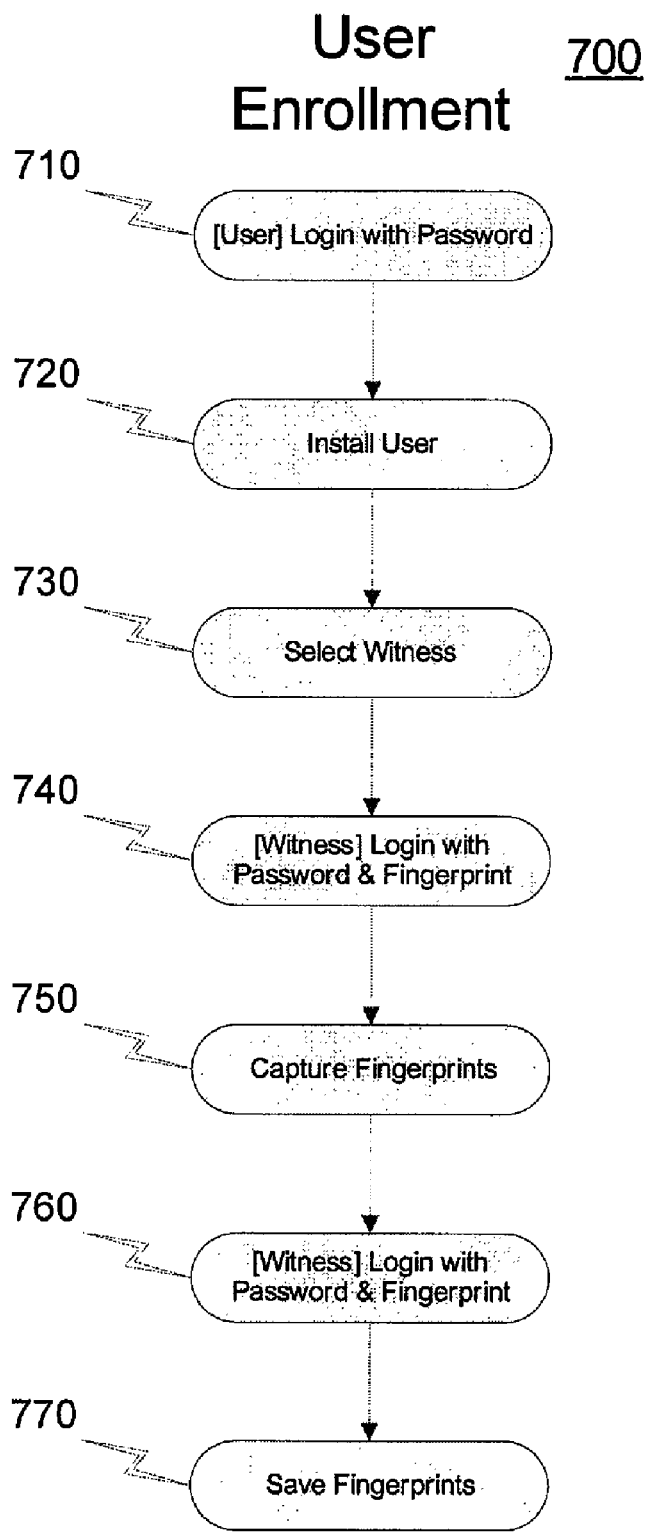
FIG. 3 illustrates user enrollment according an exemplary embodiment.
Figure 4:
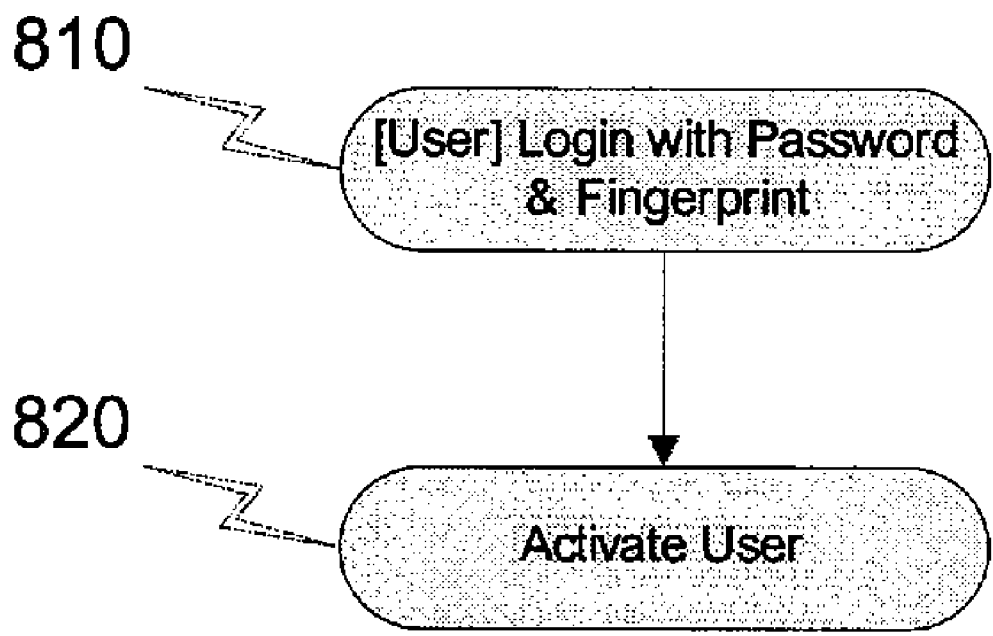
FIG. 4 illustrates user activation according an exemplary embodiment.
Figure 9:
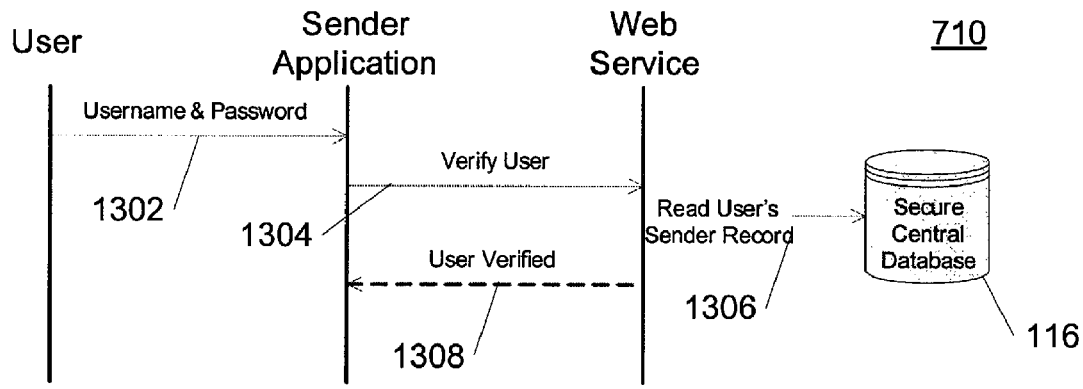
FIG. 9 illustrates the process of a user logging in utilizing his/her password according an exemplary embodiment.

Once a user has successfully registered, the next step towards becoming an active writer is the user enrollment process 700 of FIG. 3. To begin the user enrollment process 700 the user must first successfully login with password, step 710. The details of step 710 are illustrated in FIG. 9. In step 1302, the user enters the username and password he or she selected during registration. The writer application 102 requests the web service 101 to verify the user in step 1304. The web service 101 reads the central database 116 to verify that the username and password entered is valid in step 1306. In step 1308, the web service 101 returns the status of the user verification to the writer application 102.

Figure 10:
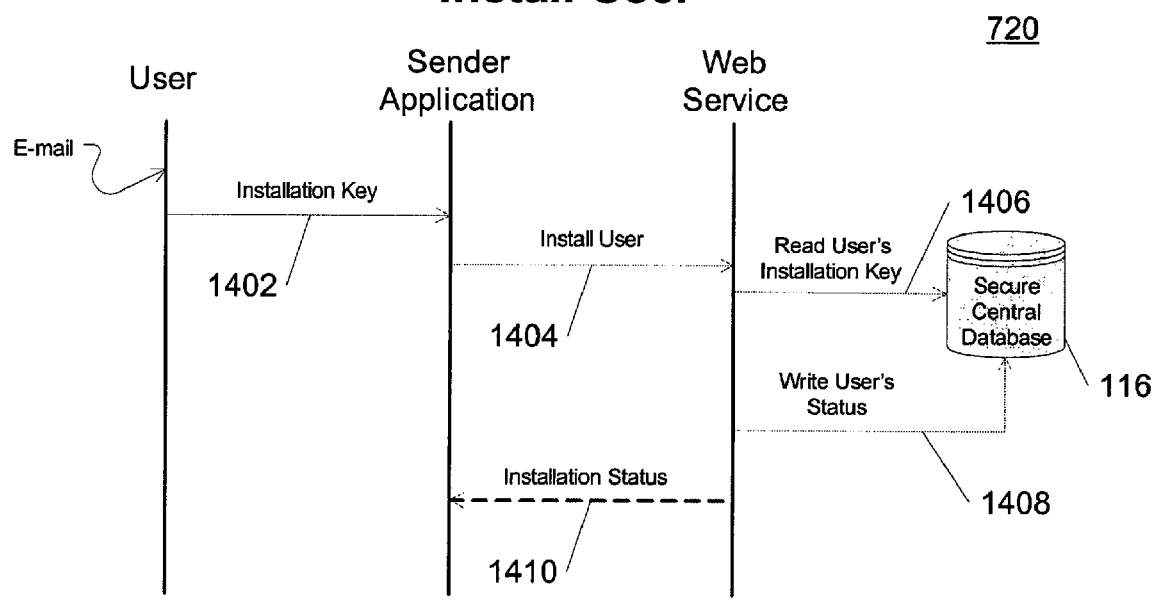
FIG. 10 illustrates the process of installing a user according an exemplary embodiment.

After successfully logging in the next step in the user enrollment process 700 is to install the user as a registered writer, step 720, which is illustrated in greater detail in FIG. 10. In step 1402, the user enters the installation key emailed to them by the web service 101 during registration. The installation key is sent to the web service 101 in step 1404. In step 1406, the web service 101 verifies the installation key matches the user's installation key stored in the central database. The web service 101 updates the user's status in the central database 116 in step 1408 and returns the installation status to the writer application 102 in step 1410.

Figure 11:
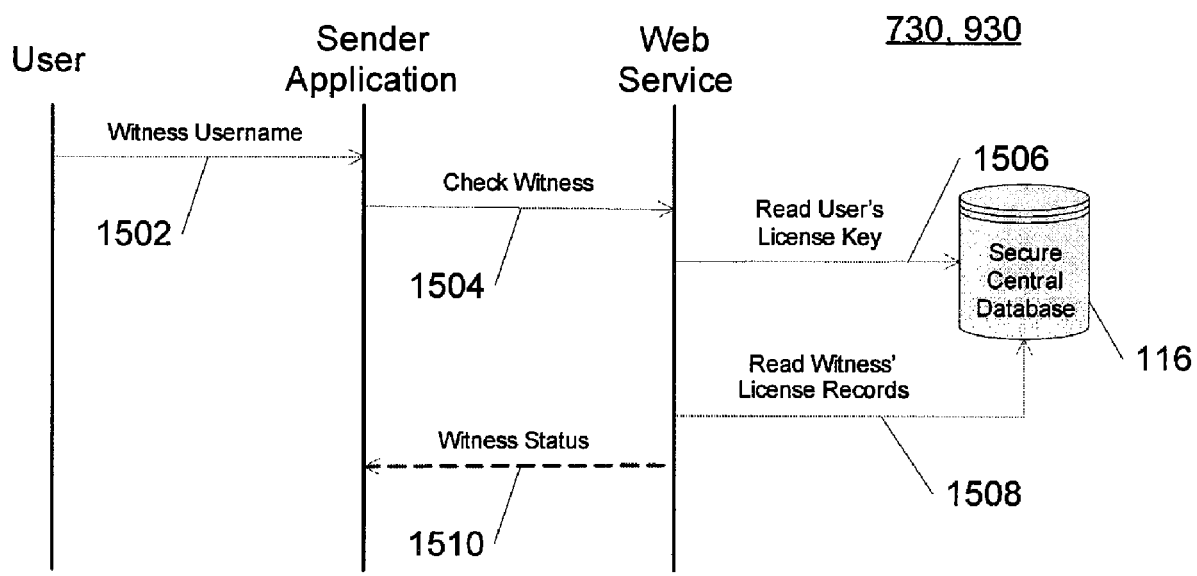
FIG. 11 illustrates the process of selecting a witness for a given license according an exemplary embodiment.

Writers 112, unless registering with a license marked with 'no registrar required', must select a registrar 114 to witness their fingerprint enrollment, step 730 of the enrollment process 700 in the select registrar step. Users that register with a license marked with 'no registrar required' that was pre-assigned to them do not require a registrar 114 to witness their fingerprint enrollment in which case steps 730 and 740 are skipped. Step 730 is skipped for surrogates 115 because the system automatically selects the writer 112 as their fingerprint enrollment witness. The details of step 730 are illustrated in FIG. 11. In step 1502, the user enters the username of the registrar 114 that will witness their fingerprint enrollment. The writer application 102 requests the web service 101 to check the registrar 114 in step 1504. In steps 1506 and 1508 the web service 101 reads the user's and witness's license information from the central database 116 to verify that the username selected is authorized to act as a witness for the user's enrollment. The web service 101 returns the witness status to the writer application 102 in step 1508.

Figure 12:
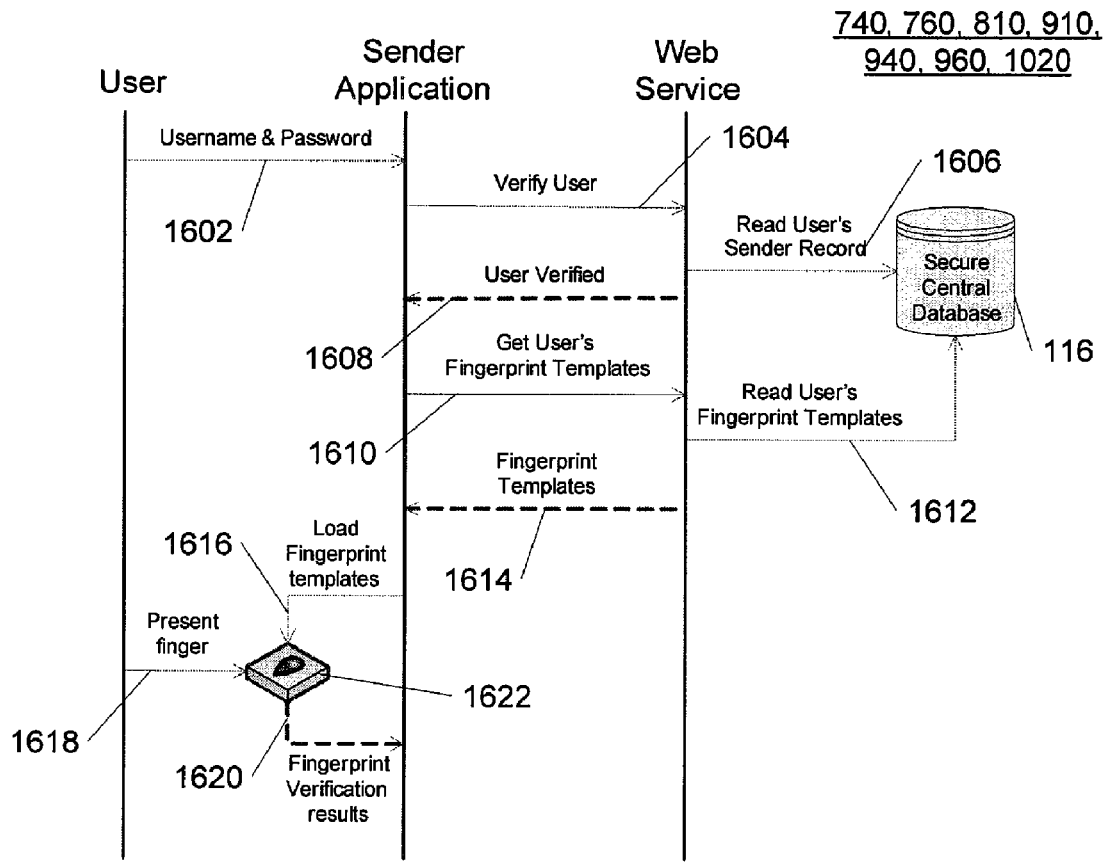
FIG. 12 illustrates the process whereby a user logs into the system utilizing his/her user name, password and fingerprint according an exemplary embodiment.

Once selected, the registrar 114 must login with password and fingerprint, step 740 of the user enrollment process 700. The details of step 740 are illustrated in FIG. 12. In step 1602 the selected registrar 114 enters their username and password. The writer application 102 requests the web service 101 to verify the registrar 114 in step 1604. The web service 101 reads the central database 116 to verify that the username and password entered is valid in step 1606. In step 1608, the web service 101 returns the witness status to the writer application 102. Next, the writer application 102 requests the biometric templates of the registrar 114 from the web service 101 in step 1610. In step 1612 the web service 101 retrieves the registrar 114 biometric templates from the central database 116. The web service 101 returns the biometric templates to the writer application 102 in step 1614. In step 1616, the biometric templates are loaded into the fingerprint sensor 1622. The registrar 114 places one of their fingers on the fingerprint sensor 1622 for verification in step 1618. The fingerprint sensor 1622 returns the fingerprint verification results to the writer application 102 in step 1620.

Figure 13:
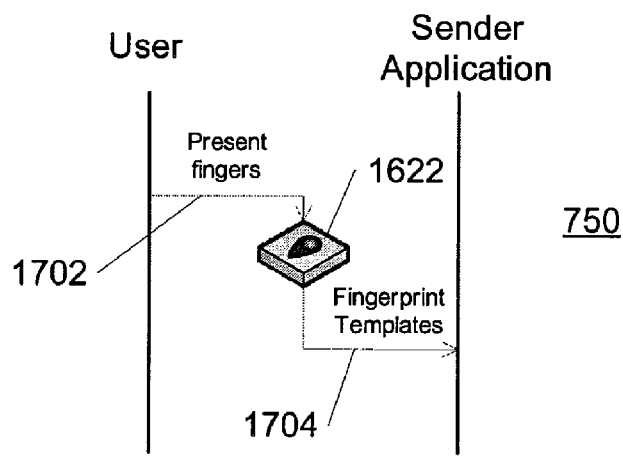
FIG. 13 illustrates the process of creating a user's fingerprint template for a given fingerprint sample according an exemplary embodiment.

The next step in the user enrollment process 700 is to capture the user fingerprints, step 750. FIG. 13 illustrates the details of step 750. In step 1702, the user is prompted to place several of his/her fingers on the fingerprint sensor 1622, one at a time, so the user fingerprints could be captured by the fingerprint sensor 1622. The fingerprint sensor 1622 sends the user's fingerprint templates to the writer application 102 in step 1704.

If a registrar 114 is verifying this fingerprint enrollment then the registrar 114 must login with password and fingerprint, step 760 of the user enrollment process 700. The details of step 760 are illustrated in FIG. 12. The registrar 114 can approve the captured fingerprints by logging in or the registrar 114 can reject the captured fingerprints and abort the user enrollment process 700 by not logging in. Step 740 and step 760 are different in that step 740 relates to the enrollment of a witness whereas step 760 relates to the enrollment of a user whose identity may or may not be authenticated by a witness.

Figure 14:
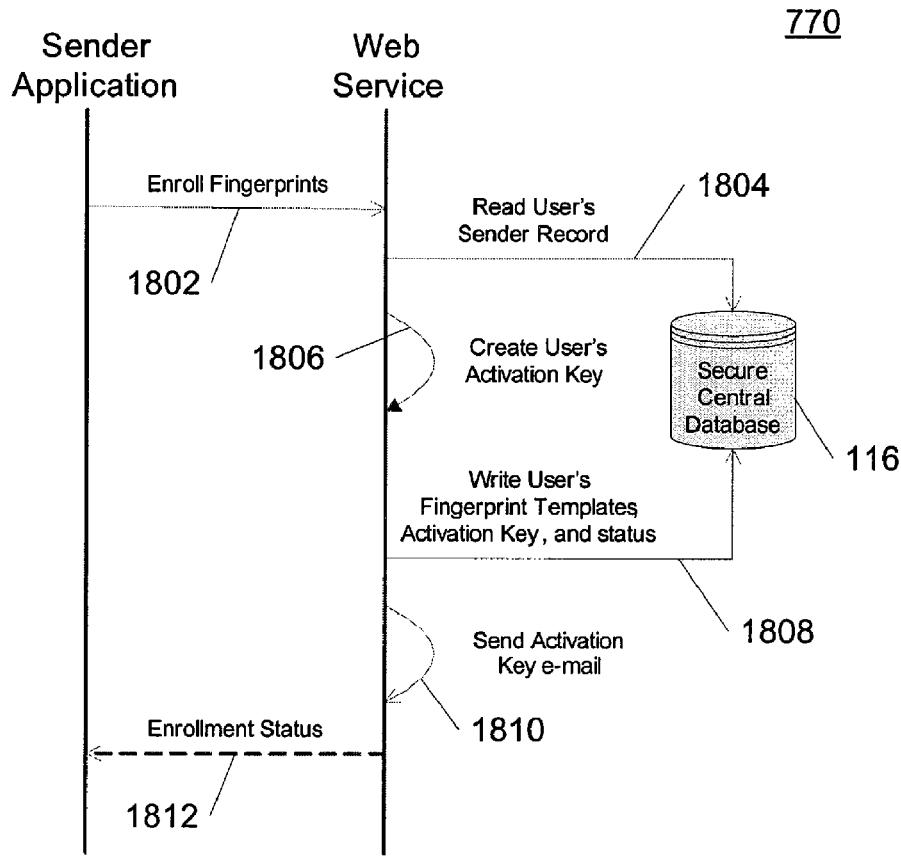
FIG. 14 illustrates the process of recording a user's fingerprint template according an exemplary embodiment.

The last step of the user enrollment process 700 is to save the user's fingerprint templates, step 770. FIG. 14 illustrates the details of step 770. In step 1802, the writer application 102 sends the captured fingerprint templates and other enrollment information to the web service 101. In step 1804, the user/writer record is retrieved from the central database 116. The web service 101 creates an activation key for the user/writer in step 1806. The web service 101 stores the user/writer activation key in the central database 116 along with the captured templates and other enrollment information in step 1808. In step 1810, the web service 101 sends the activation key to the user/writer via email. The enrollment status is returned to the writer application 102 in step 1812.

Activation

The user's last step towards becoming an active writer is the user activation process 800. The first step of the user activation process 800 is for the user to login with password and fingerprint, step 810. The details of step 810 are illustrated in FIG. 12, which was described previously.

Figure 15:
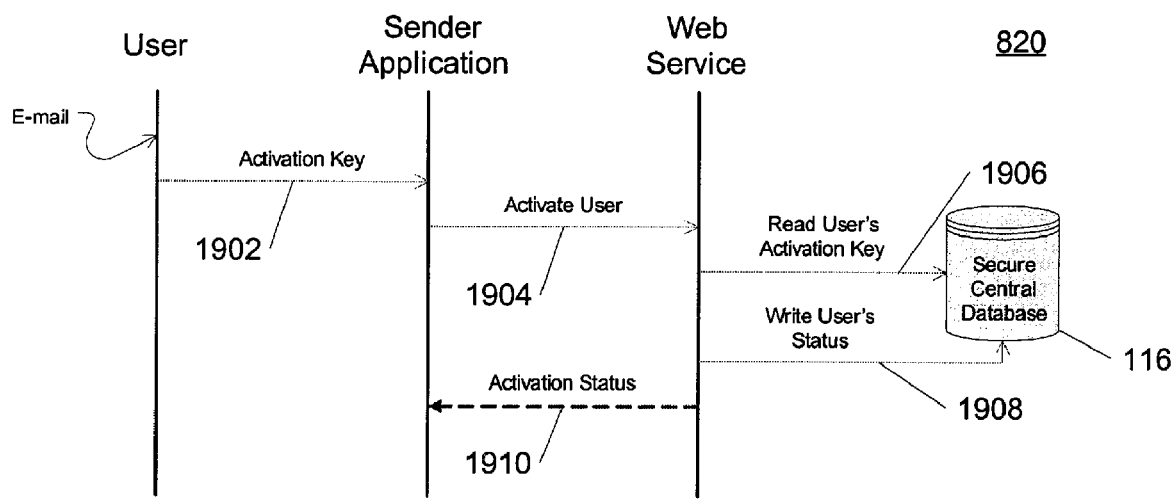
FIG. 15 illustrates the process of activating a user according an exemplary embodiment.

The last step of the user activation process 800 is to activate the writer, step 820. FIG. 15 illustrates the details of step 820. In step 1902, the writer enters the activation key emailed to them by the web service 101 during the user enrollment process 700. The writer application 102 sends the activation key to the web service 101 in step 1904. In step 1906, the web service 101 verifies the activation key matches the writer activation key stored in the central database 116. The web service 101 updates the writer status in the central database 116 in step 1908 and returns the activation status to the writer application 102 in step 1910.

Surrogate Registration

Figure 2:
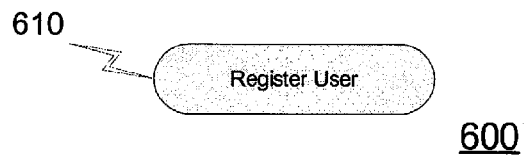
FIG. 2 illustrates user registration according an exemplary embodiment.

The surrogate registration process is similar to the writer registration process except that the witness can be the registered writer. Referring to FIG. 2, the surrogate enters their personal and professional data in step 1202. The surrogate has no license information. The surrogate also selects their username and password for the system in step 1202. The writer application 102 sends all of this registration information to the web service 101 in step 1204. The web service 101 creates an installation key for the surrogate in step 1206. In step 1208, the web service 101 validates the registration information and stores it in the central database 116 along with the installation key and updated surrogate status. The installation key is sent to the surrogate via email in step 1212. The web service 101 returns the registration status to the writer application 102 in step 1216.

Surrogate Biometric Enrollment

Once a surrogate has successfully registered, their next step towards becoming an active surrogate is the enrollment process 710 of FIG. 9. To begin the enrollment process the surrogate must first successfully login with password in step 1302. The surrogate enters the username and password they selected during registration. The writer application 102 requests the web service 101 to verify the surrogate in step 1304. The web service 101 reads the central database 116 to verify that the username and password entered is valid in step 1306. In step 1308, the web service 101 returns the status of the surrogate verification to the writer application 102.

After successfully logging in the next step in the enrollment process 700 is to install the surrogate, step 720, which is illustrated in greater detail in FIG. 10. In step 1402, the surrogate enters the installation key emailed to them by the web service 101 during registration. The installation key is sent to the web service 101 in step 1404. In step 1406, the web service 101 verifies the installation key matches the surrogate's installation key stored in the central database 116. The web service 101 updates the surrogate's status in the central database 116 in step 1408 and returns the installation status to the writer application 102 in step 1410.

Step 730 of FIG. 11 is skipped for surrogates because the system automatically selects the writer as their fingerprint enrollment witness. However, the writer must login with password and fingerprint, step 740 of the enrollment process as shown in FIG. 12. In step 1602 the writer enters their username and password. The writer application 102 requests the web service 101 to verify the writer in step 1604. The web service 101 reads the central database 116 to verify that the username and password entered is valid in step 1606. In step 1608, the web service 101 returns the writer's status to the writer application 102. Next, the writer application 102 requests the biometric templates of the writer from the web service 101 in step 1610. In step 1612 the web service 101 retrieves the writer's biometric templates from the central database 116. The web service 101 returns the biometric templates to the writer application 102 in step 1614. In step 1616, the biometric templates are loaded into the fingerprint sensor 1622. The writer places one of their fingers on the fingerprint sensor 1622 for verification in step 1618. The fingerprint sensor 1622 returns the fingerprint verification results to the writer application 102 in step 1620.

The next step in the enrollment process is to capture the surrogate fingerprints, step 750, FIG. 13. In step 1702, the surrogate is prompted to place several of his/her fingers on the fingerprint sensor 1622, one at a time, so the surrogate's fingerprints can be captured by the fingerprint sensor 1622. The fingerprint sensor 1622 sends the surrogate's fingerprint templates to the writer application 102 in step 1704.

The last step of the enrollment process 700 is to save the surrogate's fingerprint templates, step 770, illustrated in FIG. 14. In step 1802, the writer application 102 sends the captured fingerprint templates and other enrollment information to the web service 101. In step 1804, the surrogate record is retrieved from the central database 116. The web service 101 creates an activation key for the surrogate in step 1806. The web service 101 stores the surrogate's activation key in the central database 116 along with the captured templates and other enrollment information in step 1808. In step 1810, the web service 101 sends the activation key to the surrogate via email. The enrollment status is returned to the writer application 102 in step 1812.

Surrogate Activation

The surrogate's last step towards becoming active is the activation process 800. The first step of the activation process 800 is for the surrogate to login with password and fingerprint, step 810 as described above and shown in FIG. 12. The last step of the activation process 800 is to activate the surrogate, step 820 shown in FIG. 15. In step 1902, the surrogate enters the activation key emailed to them by the web service 101 during the enrollment process 700. The writer application 102 sends the activation key to the web service 101 in step 1904. In step 1906, the web service 101 verifies the activation key matches the surrogate's activation key stored in the central database 116. The web service 101 updates the surrogate status in the central database 116 in step 1908 and returns the activation status to the writer application 102 in step 1910.

Registrar Registration

The registrar registration process may be the same as for a user/writer and is therefore essentially the same as shown in FIG. 2. The registrar 114 enters their personal, professional, and license information in step 1202. The registrar 114 also selects their username and password for the system in step 1202. The writer application 102 sends all of this registration information to the web service 101 in step 1204. The web service 101 creates an installation key for the registrar 114 in step 1206. In step 1208, the web service 101 validates the registration information and stores it in the central database 116 along with the installation key and updated registrar 114 status. The installation key is sent to the registrar 114 via email in step 1212. If a license was entered by the registrar 114 its entry in the central database 116 is updated in step 1214. The web service 101 returns the registration status to the writer application 102 in step 1216.

Registrar Biometric Enrollment

Once a registrar 114 has successfully registered, their next step towards becoming an active registrar 114 is the enrollment process 700 of FIG. 10. To begin the enrollment process the registrar 114 must first successfully login with password using the procedure set forth in FIG. 9. In step 1302, the registrar 114 enters the username and password they selected during registration. The writer application 102 requests the web service 101 to verify the registrar 114 in step 1304. The web service 101 reads the central database 116 to verify that the username and password entered is valid in step 1306. In step 1308, the web service 101 returns the status of the user verification to the writer application 102.

After successfully logging in the next step in the enrollment process is to install the registrar 114, step 720, as detailed in FIG. 10. In step 1402, the registrar 114 enters the installation key emailed to them by the web service 101 during registration. The installation key is sent to the web service 101 in step 1404. In step 1406, the web service 101 verifies the installation key matches the registrar's installation key stored in the central database 116. The web service 101 updates the registrar's status in the central database 116 in step 1408 and returns the installation status to the writer application 102 in step 1410.

The registrar 114, unless registering with a license marked with 'no registrar required', must select another registrar 114 to witness their fingerprint enrollment, step 730 of the enrollment process 700 in the select registrar step. Registration data is also stored in step 730. Registrars 114 that register with a license marked with 'no registrar required' that was pre-assigned to them do not require a registrar 114 to witness their fingerprint enrollment in which case steps 730 and 740 are skipped. If a witness is required, the process proceeds as set forth in FIG. 11. In step 1502, the registrar 114 enters the username of the other registrar 114 that will witness their fingerprint enrollment. The writer application 102 requests the web service 101 to check the registrar 114 in step 1504. In steps 1506 and 1508 the web service 101 reads the Registrar's 114 and witnessing Registrar's 114 license information from the central database 116 to verify that the username selected is authorized to act as a witness for the Registrar's 114 enrollment. The web service 101 returns the witness status to the writer application 102 in step 1508.

Once selected, the witnessing registrar 114 must login with password and fingerprint, step 740 of the enrollment process as detailed in FIG. 12. In step 1602 the selected witnessing registrar 114 enters their username and password. The writer application 102 requests the web service 101 to verify the witnessing registrar 114 in step 1604. The web service 101 reads the central database 116 to verify that the username and password entered is valid in step 1606. In step 1608, the web service 101 returns the witness status to the writer application 102. Next, the writer application 102 requests the biometric templates of the witnessing registrar 114 from the web service 101 in step 1610. In step 1612 the web service 101 retrieves the witnessing registrar's biometric templates from the central database 116. The web service 101 returns the biometric templates to the writer application 102 in step 1614. In step 1616, the biometric templates are loaded into the fingerprint sensor 1622. The witnessing registrar 114 places one of their fingers on the fingerprint sensor 1622 for verification in step 1618. The fingerprint sensor 1622 returns the fingerprint verification results to the writer application 102 in step 1620.

The next step in the enrollment process 700 is to capture the enrolling registrar's fingerprints, step 750, FIG. 13. In step 1702, the enrolling registrar 114 is prompted to place several of his/her fingers on the fingerprint sensor 1622, one at a time, so the enrolling registrar's fingerprints could be captured by the fingerprint sensor 1622. The fingerprint sensor 1622 sends the enrolling registrar's fingerprint templates to the writer application 102 in step 1704.

If a registrar 114 is verifying this fingerprint enrollment then the witnessing registrar 114 must login with password and fingerprint, step 760 of the enrollment process, FIG. 12. The witnessing registrar 114 can approve the captured fingerprints by logging in or the witnessing registrar 114 can reject the captured fingerprints and abort the enrollment process 700 by not logging in.

The last step of the enrollment process 700 is to save the enrolling Registrar's fingerprint templates, step 770, FIG. 14. In step 1802, the writer application 102 sends the captured fingerprint templates and other enrollment information to the web service 101. In step 1804, the enrolling registrar's record is retrieved from the central database 116. The web service 101 creates an activation key for the enrolling registrar 114 in step 1806. The web service 101 stores the enrolling registrar's activation key in the central database 116 along with the captured templates and other enrollment information in step 1808. In step 1810, the web service 101 sends the activation key to the enrolling registrar 114 via email. The enrollment status is returned to the writer application 102 in step 1812.

Registrar Activation

The registrar's last step towards becoming an active registrar 114 is the activation process 800. The first step of the activation process 800 is for the activating registrar 114 to login with password and fingerprint, step 810, FIG. 12. The last step of the activation process 800 is to activate the registrar 114, step 820, FIG. 15. In step 1902, the activating registrar 114 enters the activation key emailed to them by the web service 101 during the enrollment process 700. The writer application 102 sends the activation key to the web service 101 in step 1904. In step 1906, the web service 101 verifies the activation key matches the activating registrar's activation key stored in the central database 116. The web service 101 updates the activating registrar's status in the central database 116 in step 1908 and returns the activation status to the writer application 102 in step 1910. Licensing.

Users of the embodiment described can have zero, one, or more licenses. Licenses can provide the following information:

Identification (e.g. registrar, writer, or reader)
Classification (industry, group, and subgroup)
Capabilities
Security requirements.

A license can be assigned to any user, other than a surrogate, when the user registers or anytime after the user has completed their installation by activating a license. The user can optionally provide additional information pertaining to the license that is stored in the license record in the central database 116. The information collected depends on the type of license being activated. Activating a license may require a witness to verify the user and approve any license information entered. The process of activation using a witness that is either a registrar or a registered writer has been described above. For the purpose of the following description, the witness will be assumed to be the registrar 114 of FIG. 1.

A registrar license allows a user to act as a witness for a user who is enrolling or activating a license. There are two types of registrar licenses: restricted and unrestricted. A user with a restricted registrar license can act as a witness for a user performing one of the following operations:

enrolling with a restricted registrar license with a compatible license classification enrolling with an unrestricted registrar license with a compatible license classification enrolling with a restricted writer license with a compatible license classification enrolling with a restricted reader license with a compatible license classification enrolling with an unrestricted writer license with a compatible license classification enrolling with an unrestricted reader license with a compatible license classification activating a restricted writer license with a compatible license classification activating a restricted reader license with a compatible license classification activating an unrestricted writer license with a compatible license classification activating an unrestricted reader license with a compatible license classification.

A user with an unrestricted registrar license can act as a witness for a user performing one of the following operations:

enrolling without a license enrolling with a restricted registrar license with a compatible license classification enrolling with a restricted writer license with a compatible license classification enrolling with a restricted reader license with a compatible license classification enrolling with an unrestricted writer license enrolling with an unrestricted reader license activating a restricted writer license with a compatible license classification activating a restricted reader license with a compatible license classification activating an unrestricted writer license activating an unrestricted reader license.

Any user can wrap a document without a license, in this case a public license is assumed. A user with one or more writer licenses can wrap a document and specify which of their writer licenses to use.

Figure 5:
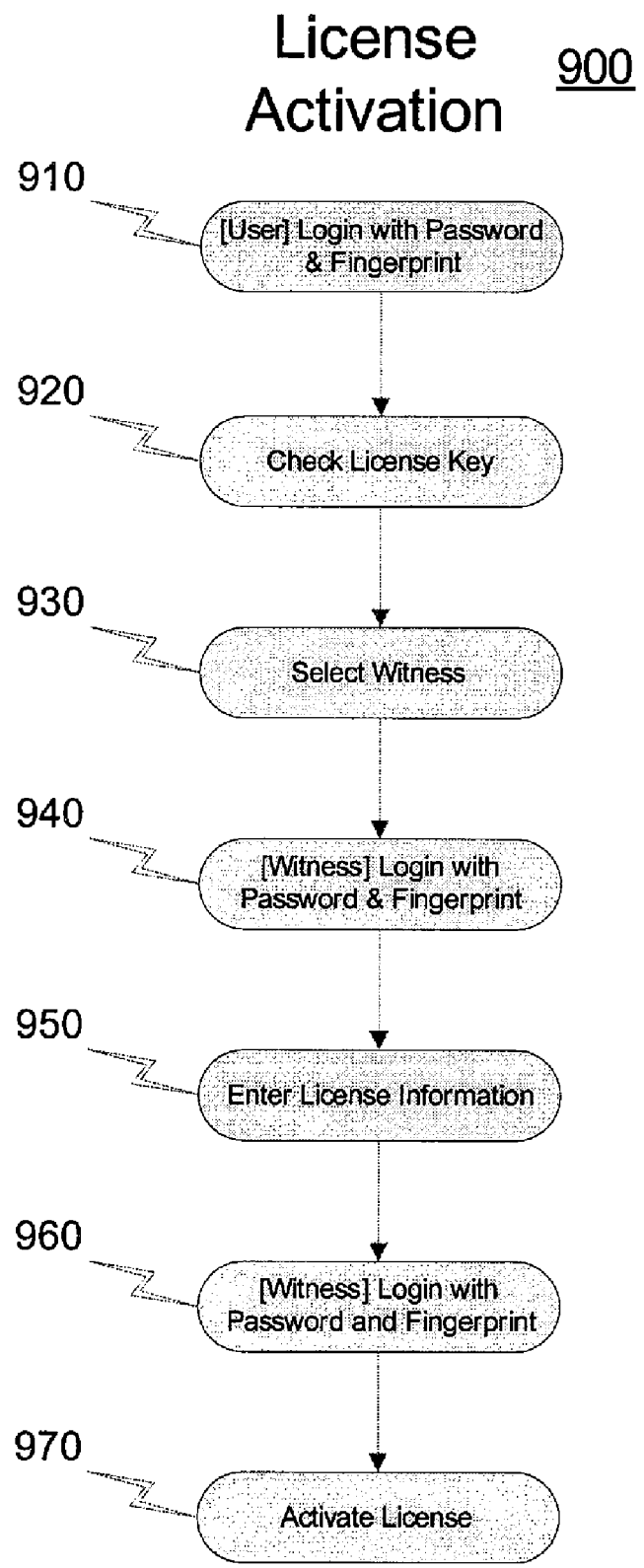
FIG. 5 illustrates license activation according an exemplary embodiment.
Figure 6:
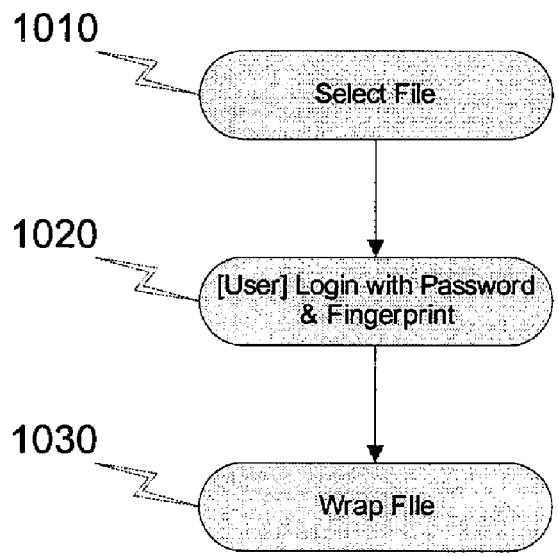
FIG. 6 illustrates wrapping a computer file according an exemplary embodiment.
Figure 7:
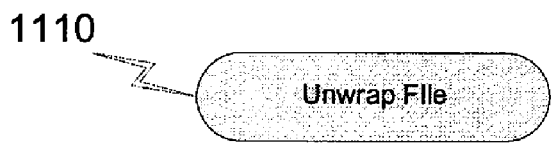
FIG. 7 illustrates unwrapping a computer file according an exemplary embodiment.
Figure 8:
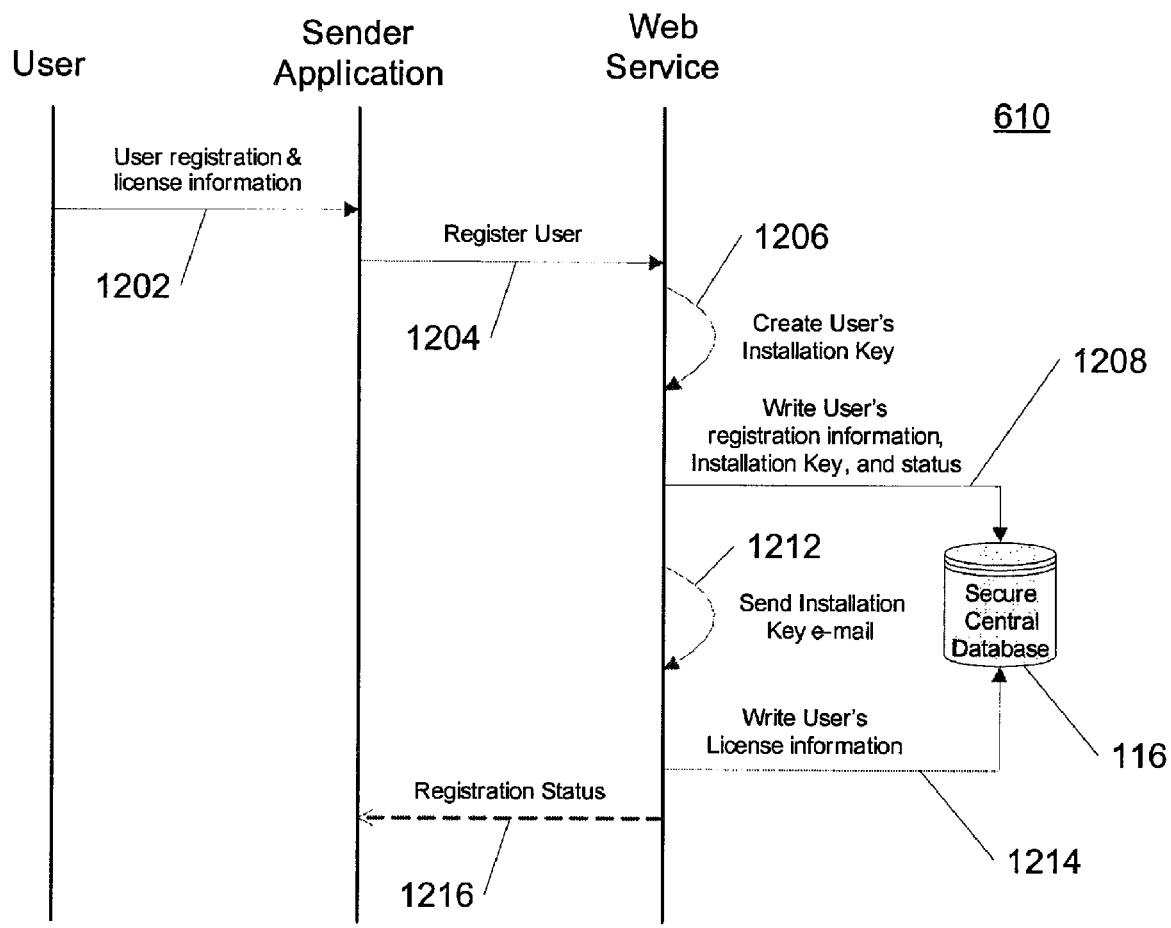
FIG. 8 illustrates the process of registering a user according an exemplary embodiment.

Any active user, other than a surrogate, can activate a license using the license activation process 900 of FIG. 5. The first step of the license activation process 900 is for the user to login with password and fingerprint, step 910. The details of step 910 are illustrated in FIG. 12.

Figure 16:
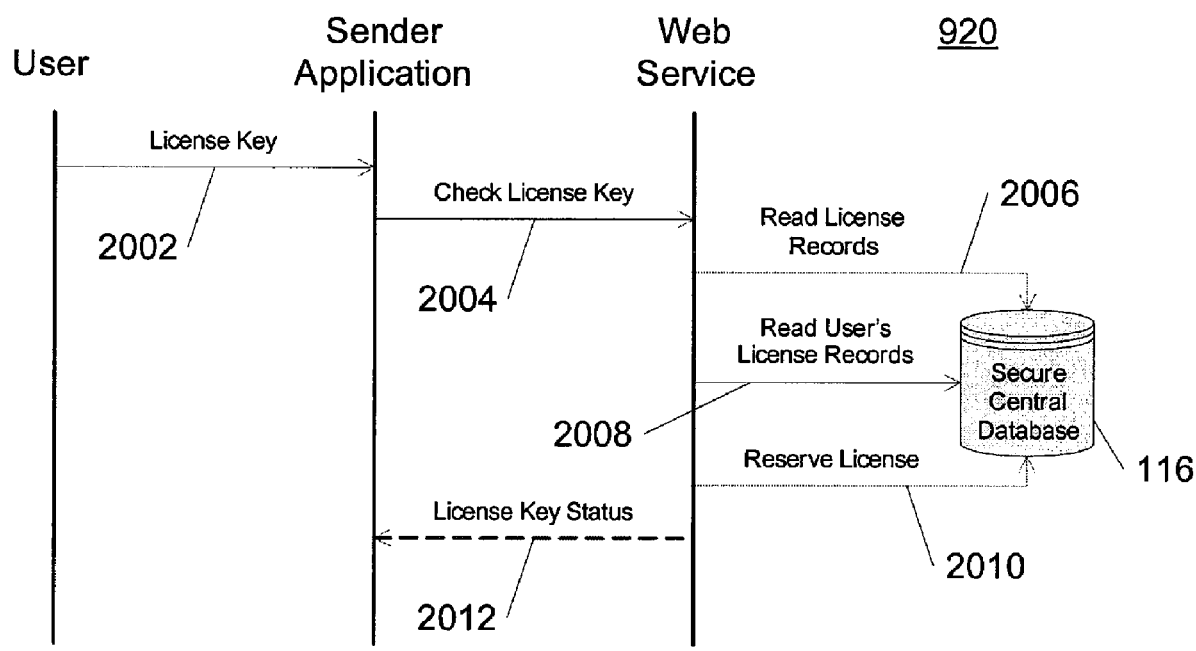
FIG. 16 illustrates the process whereby the status of a given license key is ascertained according an exemplary embodiment.

The second step of the license activation process 900 is to check the license key, step 920. The details of step 920 are illustrated in FIG. 16. In step 2002, the user enters the license key to be activated. The writer application 102 sends the license key to the web service 101 in step 2004. In step 2006, the web service 101 retrieves the records for the license to be activated from the central database 116. The web service 101 retrieves the records for all licenses already assigned to the user from the central database 116 and verifies that the license can be activated by the user in step 2008. In step 2010, the web service 101 updates the license record in the central database 116 to reserve the license for the user. The license key status is returned to the writer application 102 in step 2012.

Step 930 of the license activation process 900 is the select witness step. Some licenses do not require a witness to activate them in which case steps 930 and 940 are skipped. The details of step 930 are illustrated in FIG. 11. In step 1502, the user enters the username of the witness that will approve their license activation. The writer application 102 requests the web service 101 to check the witness in step 1504. In steps 1506 and 1508 the web service 101 reads the user's and witness' license information from the central database 116 to verify that the username selected is authorized to act as a witness for the user's license activation. The web service 101 returns the witness status to the writer application 102 in step 1508.

Once selected, the witness must login with password and fingerprint, step 940 of the license activation process 900. The details of step 940 are illustrated in FIG. 12.

Figure 17:
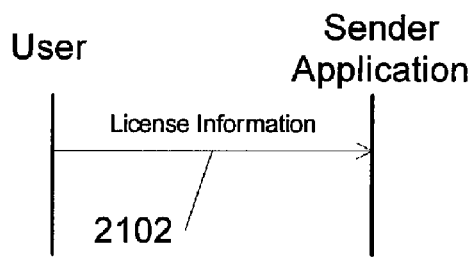
FIG. 17 illustrates the process of obtaining and storing particular information about a user according an exemplary embodiment.

The next step in the license activation process 900 is to enter the license information, step 950. FIG. 17 illustrates the details of step 950. The user has the option of entering related license information in step 2102. The type of information gathered is configurable based on the type of license being activated.

If a witness is approving this license activation then the witness login with password and fingerprint, step 960 of the license activation process 900, must be performed. The details of step 960 are illustrated in FIG. 12. The witness can approve the license activation by logging in or the witness can reject the license activation and abort the license activation process 900 by not logging in.

Figure 18:
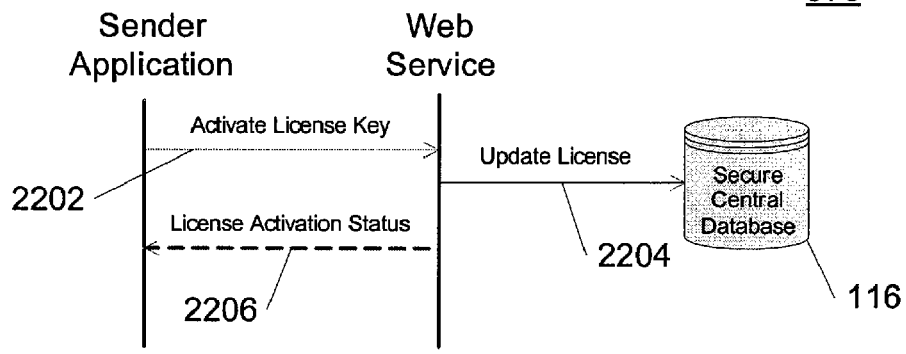
FIG. 18 illustrates the process of activating a license key according an exemplary embodiment.

The last step in the license activation process 900 is to activate the license key, step 970. FIG. 18 illustrates the details of step 970. In step 2202, the writer application 102 sends the license information to the web service 101 in a request to activate the license. The license information is stored in the license record in the central database 116 and the license is activated in step 2204. The license activation status is returned to the writer application 102 in step 2206.

File Wrap

During the file wrap process, as in other security sensitive operations, the writer application 102 monitors for user inactivity. If a logged in user leaves the application idle for a period of time which exceeds the maximum timeout period, an automatic logout is performed. The automatic logout is a security feature intended to prevent someone from logging in, and then leaving the application unattended, thus providing an opportunity for someone to wrap a file fraudulently, using the credentials of the logged-in writer or surrogate.

The file wrap process begins with an active writer or surrogate starting the writer application 102. The user locates and selects the data file 111 to be wrapped via a file open dialog. The writer application 102 then launches the login with fingerprint process 740.

Following the successful processing of the login with password and fingerprint 740, the writer application 102 encrypts a message which is sent to the web service 101. The purpose of the message is to request the creation of security components which provide highly secure communications between the writer application 102 and the web service 101. The lifespan of these components is limited, and they are of no value after they expire. The web service 101 processes the message and creates the security components. Information is stored in the secure central database 116 and added to the response message. The response is encrypted and returned to the writer application 102, where the file wrap processing continues.

The writer application 102 (see FIG. 19) encrypts a key request message 2404 incorporating the security components. The encrypted key request in operation 2404 is sent to the web service 101. The web service validates the request by checking the validity of security components. If the request is validated, the encryption key and other information needed to wrap a file are created, and saved in an operation 2406 in the secure central database 116. The information is encrypted and returned in an operation 2408 to the writer application 102. The selected file is encrypted in an operation 2412 by the writer application 102 using the encryption key, other information, proprietary processing and industry standard encryption algorithms.

The application 102 displays a form to allow the certified writer or surrogate to enter text in an operation 2410, which could be a description of the file being wrapped, a message to the intended recipient, or any other information. The text entered here, if any, will be viewable in the reader application 103 when the file is unwrapped. If no text is entered, the reader application 103 will indicate that no information was provided. The writer application 102 checks whether any active writer or restricted writer licenses are assigned to the certified writer. If suitable licenses are available, one license may be selected from a drop-down list before the file is wrapped. If no license is selected, the Public license is used by default.

If the certified writer or surrogate uses a non-public license to wrap a file, the license processor will apply the rules defined for that license to control the unwrapping of the file. Rules are defined for each writer or restricted writer license which are used to identify compatible reader licenses which can be used in the unwrap process. The information entered on the form by the certified writer or surrogate, including some licensing information, is added to the package being wrapped.

The writer application 102 creates a request for writer and/or surrogate information, which is encrypted and sent to the web service 101. The web service retrieves the required information from the secure central database 116. The information is encrypted and returned to the writer application 102. The information is added to the package being wrapped, and will be displayed in the reader application 103 when the file is unwrapped. The information includes the name of the person who wrapped the file, the company, city, state and email address. If the person wrapping the document is a surrogate, their own information is included, and the name, city and state of the certified writer 112 who authorized the surrogate are also included.

The wrapped package, which already contains the encrypted file, file information, a block of random data, and writer/surrogate information, is encrypted again. A Globally Unique Identifier (GUID) is created and added to the wrapped package. A message digest hash is computed for the entire wrapped package. The GUID, license information and message digest value are encrypted and sent in an operation 2414 to the web service and stored in the secure database. The file save dialog opens, and the user saves the wrapped file in an operation 2422.

File Unwrap

The file unwrap process begins by double-clicking on a wrapped file, which launches the reader application 103. Alternatively, the reader application can be started via the desktop icon, and using the file open dialog, the user locates and selects the file in an operation 2502 to be unwrapped, see FIG. 20. The file is read in an operation 2503 into the reader application 103. The message digest hash is computed 2504 and the file identification information is extracted. If the reader is registered 118, as opposed to being anonymous 113 the reader's username is included in a message in an operation 2507 requesting information needed to unwrap the file, which is encrypted and sent to the web service 101.

Figure 19:
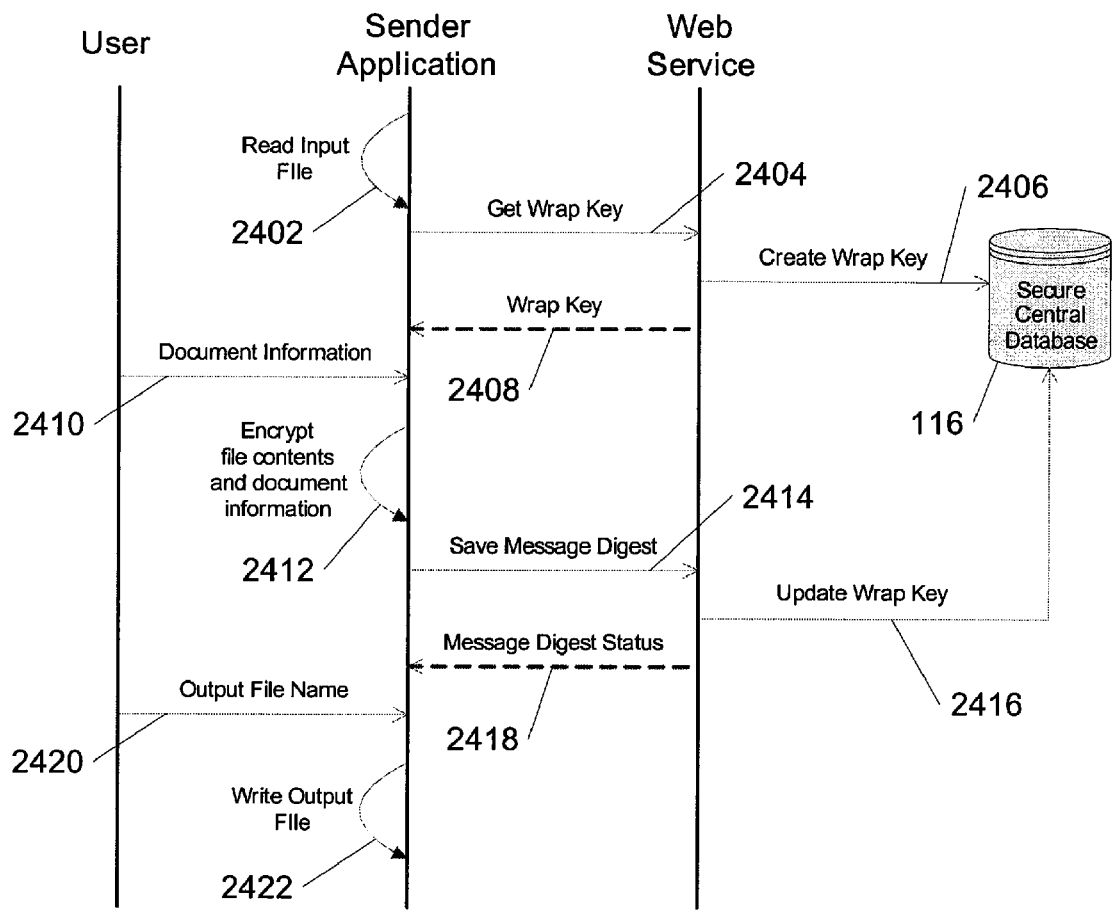
FIG. 19 illustrates the process of wrapping a computer file according an exemplary embodiment.
Figure 20:
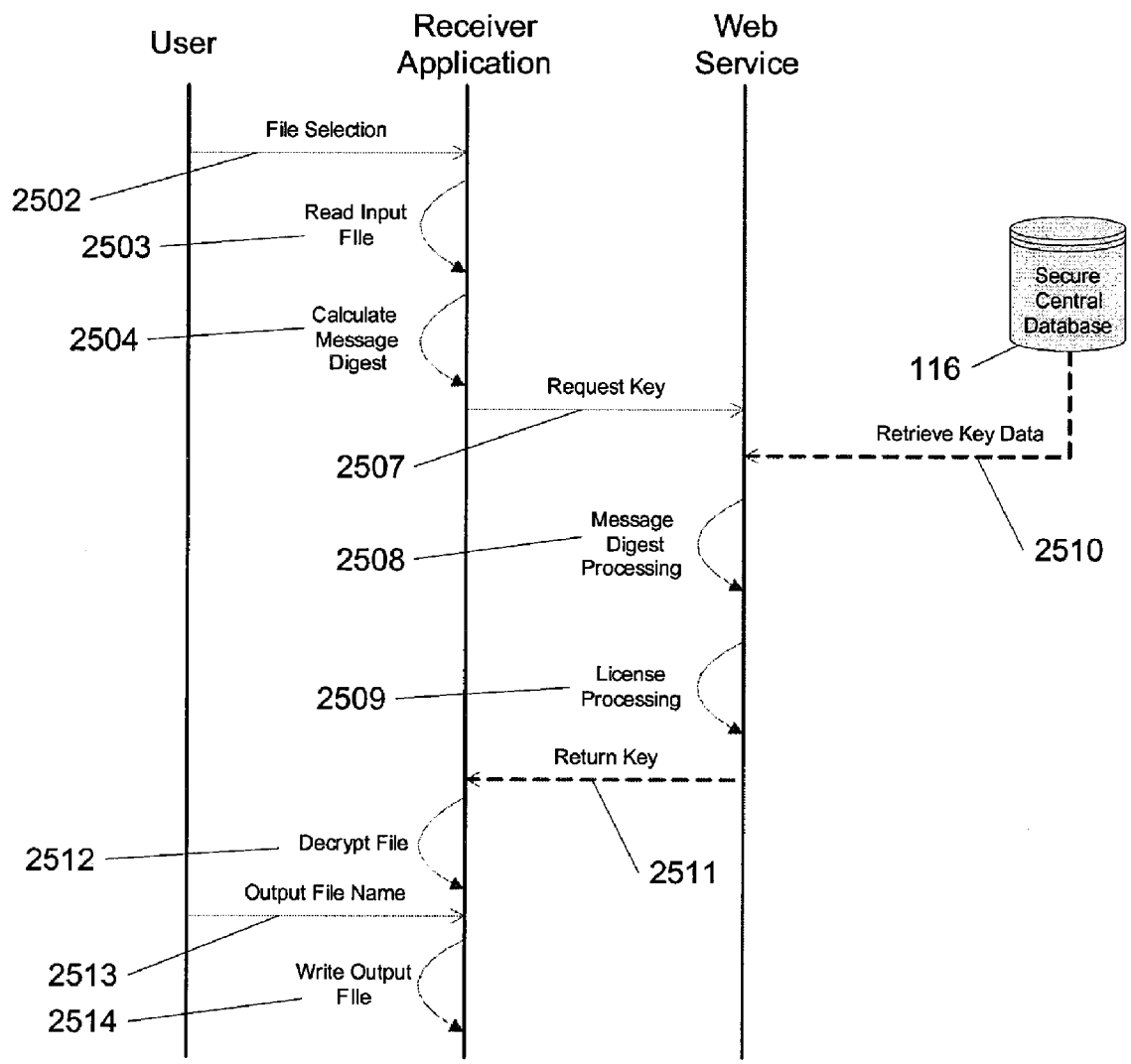
FIG. 20 illustrates the process of unwrapping a wrap file according an exemplary embodiment.
Figure 21:
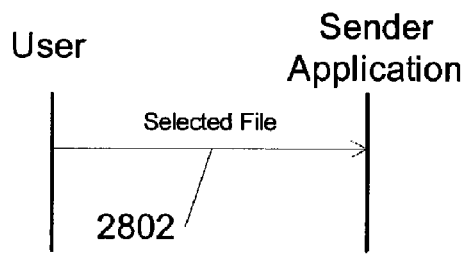
FIG. 21 illustrates the process whereby the user selects a specific computer file for presentation to the wrap process according an exemplary embodiment.

The web service 101 receives the request in an operation 2507 and decrypts the information sent by the reader application 103. Information is retrieved in an operation 2510 from the secure central database. If the reader's username was included in the request message in an operation 2507, the capabilities and restrictions associated with the reader 2501 are provided to the license processor 2509, along with information about the active licenses held by the reader 2501. Information about the license used during the file wrap process FIG. 19 is provided to the license processor in an operation 2509 and any required processing is performed including saving the unwrapped record in an operation 2515. The reader application decrypts the file in operation 2512, receives a file name output from the user in an operation 2513 and writes the output file in an operation 2514. The message digest checks in an operation 2508, license processing and other web service processing produces one of the following results:

1) Login Required—login with password and fingerprint
2) Success—no login required
3) Denied—the unwrap criteria are not met by this Reader
4) Corrupted—the message digest comparison failed
5) Failed—the system is unable to process the request The result returned by the web service determines the actions which follow.

The results "Login Required" and "Success" return all of the information needed to unwrap the file, but the "Login Required" result also returns a value which is recognized by the reader application 103 as a signal to launch the Login with Fingerprint process.

The "Denied" result indicates that a restriction exists on the reader 118 or the license processor determined that a license rule prohibits the reader 118 from unwrapping the file. The web service 101 will not return the decryption key and other information needed to unwrap the file.

The "Corrupted" result indicates that the message digest value which was supplied by the reader application 103 did not match the value computed when the file was wrapped. The web service 101 will not return the decryption key and other information needed to unwrap the file.

The "Failed" result indicates that a processing error occurred in the web service 101 which prevented all of the required processing to be completed successfully. The web service 101 will not return the decryption key and other information needed to unwrap the file.

If an unsuccessful response is returned by the web service 101, a suitable message is displayed to the user, and processing ends.

If the web service 101 returns "Login Required", the reader application 103 launches the Login with the Fingerprint process. After a successful login, the reader application 103 uses the information returned by the web service 101 to unwrap the file. If the response was "Success", the reader application 103 uses the information returned by the web service 101 to unwrap the file.

If the user 118 is a registered reader, rather than an anonymous reader, a message is encrypted and sent to the web service 101 to log the unwrapping of the file. The log record includes a link to the wrap key record, a link to the Reader record and a timestamp.

After successfully unwrapping a file, the identity of the person who wrapped the file is displayed in the reader application 103. If the person who wrapped the file was a surrogate, the identity of the writer who authorized the surrogate is also displayed. A description of the license which was used to wrap the file is also displayed. If descriptive text or a message to the reader was entered when the file was wrapped, it is displayed to the user.

When a file is unwrapped, the reader application 103 enables two buttons. The save button opens a file save dialog, which allows the user to save a copy of the unwrapped file. The open button will launch the appropriate application to view the file, if it is a viewable file type. For example, if the file which was wrapped is a Microsoft Word document, then the open button will launch Microsoft Word and the unwrapped document will be displayed. If the original file was an Adobe PDF file, then Adobe Acrobat is launched and the unwrapped document is displayed. Please note that the application used for viewing the unwrapped file must be an installed application on the Reader's PC.

User Roles

Writer

The writer is registered as the main user of the writer application on a single PC. The writer has use of the default public license, and may also hold one or more additional licenses, depending on business requirements. The identity of the writer is revealed when a file wrapped by that writer is unwrapped. The writer may designate up to 4 surrogates who may wrap files on the writer's PC.

Surrogate

The surrogate is a person trusted and authorized by a writer to wrap files on his/her behalf. The concept of the surrogate allows the work of the writer to be performed by a substitute when the writer is not present. The fact that a file was wrapped by a certified surrogate is recorded in the secure central database and is revealed to the person who unwraps the file. The user of the reader application who unwraps the file sees the surrogate's identity information as well as a notation indicating the writer who authorized the surrogate. Any file wrapped on behalf of the writer must be processed only on the writer's PC used in the registration process. Licenses are not issued to surrogates, but the surrogate can use most types of licenses issued to the writer who authorized the surrogate. The surrogate may not use a registrar license issued to the writer to perform registrar duties. See the following section for more information about the registrar.

Registrar

The registrar is actually a writer who holds a special type of license which enables the registrar to function in the role of a witness during biometric enrollment and license activation for potential certified writers and readers. The registrar is responsible for verifying the potential writer's identity, and then verifying that the writer or reader submits only his/her own biometric samples (fingerprints) to the system according to the established enrollment process. The biometric information is critical in verifying the identity of a user, the enrollment process must be witnessed and certified by the registrar, and the identity of the certifying registrar is saved in the enrollee's record in the central database. Refer to the section on biometric enrollment for details.

Reader

The licensing system provides a great deal of flexibility for the users of the system. A reader can be either unregistered or registered. An unregistered reader is anonymous, and may always unwrap files which were wrapped using the default public license. The unregistered reader may also be able to unwrap files which were wrapped with other licenses. The licensing system allows processing rules to be designed for a license which determine who may unwrap a file which was wrapped using the license.

A registered reader is not anonymous. The embodiment described is able to recognize a registered reader, and a registered reader may be issued one or more licenses, as needed to meet whatever business requirements exist.

Security

It is anticipated that the embodiment described will be subjected to attacks by persons or groups. The attacks may be intended to break into the wrapped file and alter the contents for the purpose of committing fraud. Other possible attacks could be the attempt to impersonate a legitimate user and provide falsified information in wrapped files which appear to be the work of the legitimate user, but are not.

The architecture of the embodiment described has been carefully designed to make the system resistant to attacks on the technology and the processes. The embodiment described provides multiple layers of security in all sensitive areas. The processes and procedures which have been defined for installation, registration, enrollment and activation help ensure that biometric identification credentials of users of the present invention cannot be falsified. These processes and procedures work together with layers of software security technology to ensure the integrity of the information being protected. The software technology used to implement the layers of protection include secure communication between the client applications and the web service, layered encryption, proprietary encryption key management, insertion of blocks of seemingly random data, information obfuscation, digital signature generation, and encryption based application security.

Secure Communication with Web Service

The embodiment described incorporates a distributed processing architecture which divides processing tasks between the user's PC and secure web servers. The writer and reader applications perform processing, encrypt partial results, and pass the encrypted information to the web service, where processing continues. The results of the processing performed on the web server are encrypted and returned to the writer or reader application, where processing continues.

All sensitive information is encrypted before being passed between the writer and reader applications and the web service. The encryption keys used to secure communications between the writer and reader applications and the web service are changed frequently during processing, and are independent of the encryption keys used to protect the contents of the wrapped file.

Layered Encryption

The embodiment described uses modern, industry standard encryption technology to protect the information being wrapped. The system uses several proprietary enhancements to the encryption technology to provide a higher level of security to the wrapped file. One of the techniques used in the protection scheme is that of layered encryption.

Encryption Key Management

The embodiment described uses modern, industry standard encryption technology to protect the information being wrapped. The system uses several proprietary enhancements to the encryption technology to provide a higher level of security to the wrapped file. One of the techniques used in the protection scheme is that of very strong encryption keys which are created and managed by a key management system. The key management system improves the security of the present invention by increasing the level of difficulty an attacker faces when trying to reverse engineer the key generation process.

Blocks of Seemingly Random Data

The embodiment described incorporates the use of blocks of seemingly random data to increase the level of difficulty encountered by a potential attacker when trying to defeat the protection schemes used by the system. Theses blocks are used as one of the inputs to the cryptographic algorithms. The inclusion of these blocks aid in preventing any recognizable patterns which could provide clues to an attacker about the operation of the present invention. The present invention uses this technique in many of the sensitive areas. The recipient of the protected data must know the location and, in some cases, the content of these blocks in order to make use of the protected data.

Obfuscation

Obfuscation, or the generation of hash values from data, is used to enhance security and conceal information during processing in both the user's PC and the web service. The embodiment described performs obfuscation of sensitive information in the writer and reader applications and in the web service, and processes the obfuscated values and other information to determine processing results.

Application Security

The writer and reader applications cannot be started directly. Additional encrypted information must be provided in order to startup and execute the applications correctly. The purpose of this requirement is to enhance the security of the applications. An attempt to bypass portions of the application will result in an unrecoverable error, preventing the attacker from successfully running the application using this strategy.

While the invention has been described in what is presently considered to be a preferred embodiment, it should be understood that this is done for illustration purposes only. A person skilled in the relevant art will recognize that other components and configurations may be used without parting from the spirit and scope of the appended claims.

The invention claimed is:

1. A method for authenticating the source of, protecting the contents of, and ensuring the integrity of digital information received via any electronic media, comprising:
   receiving encapsulated information in a computer file at a writer application, wherein the computer file includes a biometrically verified identity of a person who encapsulated the information;
   creating a first message digest value at the writer application and storing the first message digest value and a global unique identifier (QUID) in a secure central database at a web service, wherein the first message digest value and GUM function as a digital signature of the computer file;
   recording, in a document usage record at the web service, the biometrically verified identity of the person who encapsulated the information and a timestamp corresponding to when the information was encapsulated;
   receiving the computer file and generating a second message digest value from the encapsulated information at a reader application; and
   communicating with a web service to compare the second message digest value with the first message digest value, the web service providing a decryption key upon a successful comparison of the first message digest value to the second message digest value, whereby the decryption key permits opening of the computer file; and
   recording, in the document usage record at the web service, an identity of a person who accesses the encapsulated information and a timestamp corresponding to when the encapsulated information is accessed.

2. The method of claim 1, further comprising determining an identity of the person who encapsulated the information by requiring an a priori enrollment process where the person is witnessed and approved in person by a registrar, and wherein biometric data of the person is stored by the web service.

3. The method of claim 2, further comprising comparing the biometric data associated with the file to biometric data stored with the web service.

4. The method of claim 1, further comprising encrypting the information in the computer file.

5. The method of claim 1, further comprising communicating a license key dictating use parameters of the computer file.

6. The method of claim 1, further comprising a request for the decryption key for the computer file.

7. A document security system comprising:
   a server configured to communicate with a plurality of computers coupled to a network; and
   a database coupled to the server and storing document security information and document usage records;
   wherein the server executes instructions to:
      incorporate biometric identity information received from a first computer with a computer file such that the biometric identity information enables security for the computer file;
      record an identity of a person corresponding to the biometrically verified identity information and a timestamp in the document usage records;

receive a unique message digest value associated with the computer file from at least one of the plurality of computers;

store the unique message digest value; and manage security for the computer file responsive to a request from a second computer.

8. The system of claim 7, wherein the security for the computer file comprises a plurality of licenses defined at the server, wherein the plurality of licenses include information on use restrictions corresponding to the computer file.

9. The system of claim 7, further comprising a writer application configured to communicate with the server, request an encryption key from the server, and encrypt file contents using the received encryption key.

10. The system of claim 7, wherein the first computer creates the unique message digest value using the computer file and stores the unique message digest value at the server.

11. The system of claim 7, further comprising a reader application configured to create the unique message digest value for the computer file and communicate the unique message digest value and a global unique identifier (GUID) to the server.

12. The system of claim 11, wherein the server executes instructions to verify the GUID and unique message digest value associated with the computer file.

13. The system of claim 7, further comprising a reader application is configured to receive a decryption key from the server and decrypt the computer file.

14. The system of claim 7, further compromising a writer application configured to allow a registrar previously enrolled and authorized to biometrically log in to initiate an enrollment process for a new user.

15. The system of claim 7, further compromising a writer application configured to allow a registrar that initiated an enrollment process to biometrically log in again after biometric collection to approve enrollment.

16. The system of claim 15, wherein the server executes instructions to associate biometric identity of the registrar with the enrolled biometric and the server executes instructions to store the association.

17. The system of claim 15, wherein the server executes instructions to generate a plurality of activity reports associated with registrar.

18. The system of claim 15, wherein the server executes instructions to permit revocation of users witnessed by a given registrar.

19. The system of claim 7, wherein the server executes instructions to:

determine the identity of the person corresponding to the biometrically verified identity by requiring an a priori enrollment process where the person is witnessed and approved in person by a registrar, and store biometric data of the person.

20. The system of claim 7, wherein the server executes said instructions to record an identity of a person corresponding to the biometrically verified identity information and a timestamp in the document usage records in response to an incorporation, by the person, of the biometric identity information received from the first computer with the computer file or in response to the computer file being accessed by the person.

* * * * *

UNITED STATES PATENT AND TRADEMARK OFFICE
CERTIFICATE OF CORRECTION

PATENT NO. : 7,844,832 B2  
APPLICATION NO. : 11/564655  
DATED : November 30, 2010  
INVENTOR(S) : Ron L. Nation, Rodney P. Meli and William T. Garner Page 1 of 1

It is certified that error appears in the above-identified patent and that said Letters Patent is hereby corrected as shown below:

IN THE CLAIMS:

Column 16, Claim 1, line 18, "Quid" should be changed to --GUID--; and

Column 16, Claim 1, line 20 "Gum" should be changed to --GUID--.

Signed and Sealed this  
Eighth Day of March, 2011

David J. Kappos  
*Director of the United States Patent and Trademark Office*